Patented June 24, 1930

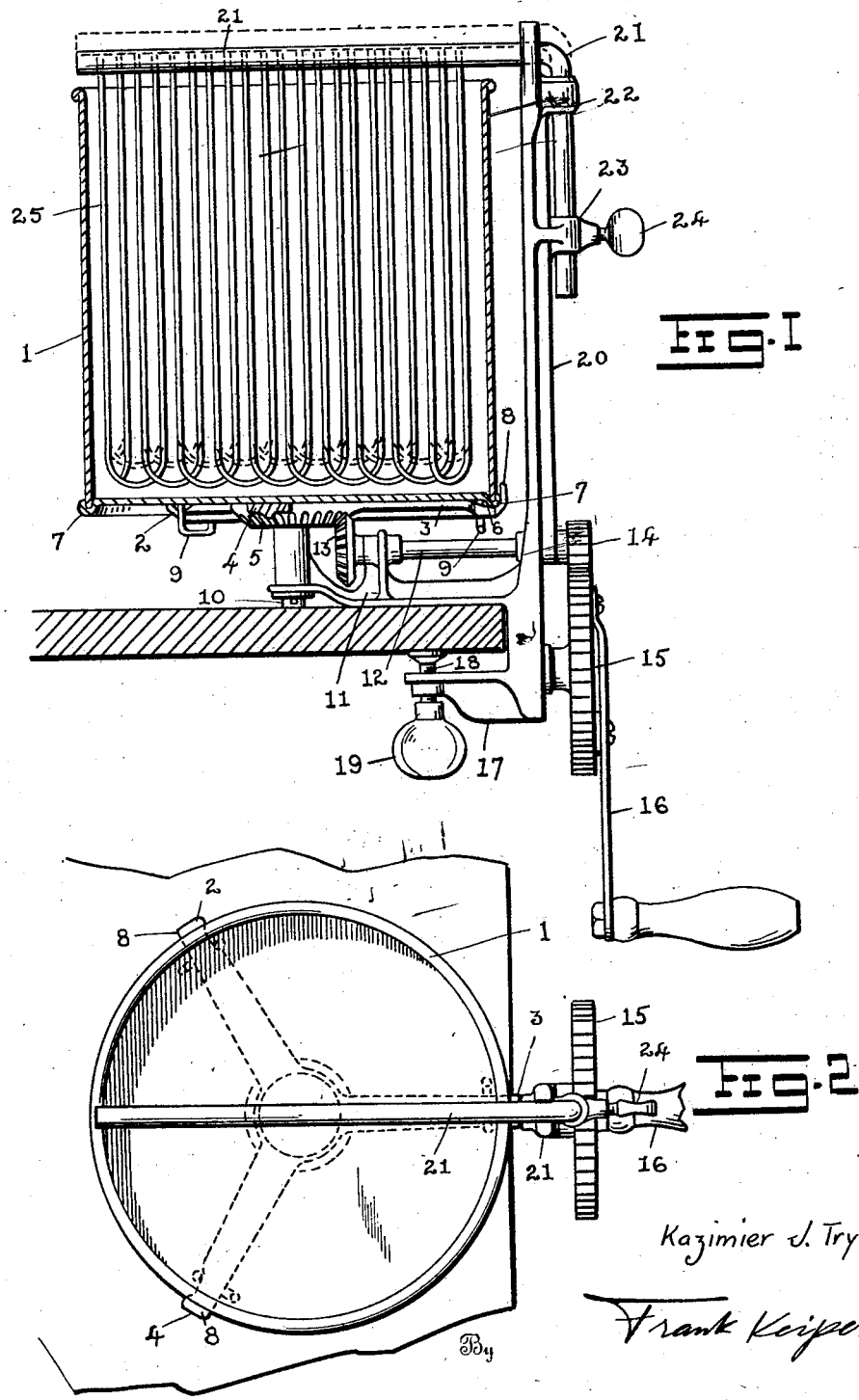

1,765,638

UNITED STATES PATENT OFFICE

KAZIMIER J. TRYNOSKI, OF COLD WATER, NEW YORK

MIXING APPARATUS

Application filed March 31, 1927. Serial No. 180,038.

This invention relates to mixing machines used especially for preparing mayonnaise dressing and has for its object to provide a machine suitable for manual operation that will prepare a larger quantity of dressing than has heretofore been possible with any other hand operated device.

These and other objects of this invention will be fully illustrated in the drawing, described in the specification and pointed out in the claims at the end thereof.

In the accompanying drawing:

Figure 1 is a side elevation and partial section of the mixing apparatus.

Figure 2 is a top plan view of the mixing apparatus.

In the figures of the drawing, like reference numerals indicate like parts.

The mixing apparatus forming the subject matter of this invention is intended for those who are in need of a machine that will produce a quantity of mayonnaise dressing that is greater than has heretofore been possible to produce with the aid of hand mixers, but who do not need a power driven apparatus as the volume of dressing needed is not large enough to warrant the cost of a power driven equipment and the cost of operating it. The container or mixing drum in which the mayonnaise dressing is mixed is made large enough to receive the contents for a gallon of dressing and provide enough space for the proper mixing of this quantity of dressing.

This mixing drum is indicated by reference numeral 1 and comprises a cylindrical container that is open at the top. The flat bottom of the mixing drum is supported by the radial arms 2, 3 and 4 that project from the hub of the bevel gear 5 and preferably form an integral part therewith. The outer end of these supporting arms are provided with a slight depression 6 to receive the circular flange or bead 7 formed at the bottom of the mixing drum 1. In addition to the depression each arm is also provided with an upwardly projecting lug 8 which is adapted to project up on the outside of the mixing drum in order to locate the drum centrally between them. For each of the arms 2, 3 and 4, the bottom of the mixing drum is provided with a wire loop 9 that is pivotally mounted on the under side of the bottom of the drum so that when the drum is supported by the arms these wire loops can be swung over the lugs 8 of the arms and embrace the outer ends of the arms below the mixing drum in order to lock the drum in place on the radial arms and make the drum rotate with the arms.

The bevel gear 5 with its radial arms is carried on top of the pivot stud 10 that is mounted to rotate in a vertical bearing provided in the outer end of the frame 11. A horizontal shaft 12 is also mounted in suitable bearings provided in the frame 11 and this shaft carries at one end the bevel pinion 13 which meshes with the bevel gear 5. The horizontal shaft has also the pinion 14 keyed thereto on the outside of the frame 11 and this pinion meshes with the gear 15 mounted to rotate on a suitable stud projecting from the frame 11 near the lower end thereof. A crank handle 16 is attached to the outer face of the gear 15 by means of which the gear 15 and the train of gearing heretofore described is operated to rotate the mixing drum mounted on top of the bevel gear 5.

A short rearwardly projecting arm 17 provided at the bottom of the frame 11 carries at the outer end the clamping screw 18 which is adapted to be threaded against the under side of the table on which the frame 11 is supported. A hand wheel 19 is provided for this purpose on the clamping screw so that the frame is firmly clamped to the edge of a table on the rotation of this hand wheel in a direction that will thread the clamping screw against the under side of the table as above pointed out.

The upright 20 which projects from the frame 11 is bifurcated at the top in order to have the arm 21 engage therein. On the side of the upright are provided a pair of lugs 22 and 23 each of which has a hole therethru, thru which the downwardly projecting end of the arm 21 can pass in order to hold this portion of the arm 21 in a vertical position. A set screw 24 is threaded into the lug 23 and serves to clamp the vertical portion of the arm adjustably in place in this lug. In this way the arm may be raised or lowered within a limited distance that is governed by the depth of the groove formed by the bifurcation in the upper end of the upright 20.

Depending from the arm 21 are a series of wire fingers 25 which are arranged in pairs that are looped together at the bottom. The loops of these wire fingers overlap each other and are preferably spot welded together in order to give the screen formed by the wire fingers, the necessary rigidity that will resist the liquid as it passes thru between the fingers.

The oil and other ingredients that are mixed to produce the mayonnaise dressing are gradually fed into the open top of the mixing drum 1 while the can is being rotated by means of the handle 16. The ratio of the train of gearing which transmits the movement of the crank 16 to the mixing drum is such as to rotate the can at a rapid rate of speed so that the ingredients fed into the mixing drum are continually and rapidly forced thru between the wire fingers of the screen. After the ingredients have all been fed into the mixing drum and the mixture is beginning to get stiff especially at the bottom of the drum it is desirable to raise the arm 21 so that the portion of the mixture that is practically finished can pass under the screen while the remainder of the mixture is brought to its proper consistency. The adjustment of the vertical portion of the arm serves to provide the necessary adjustment for the screen within the mixing drum, it being understood that at the beginning of the mixing operation the looped ends of the wire fingers making up the screen extend practically to the bottom of the mixing drum.

I claim:

1. In a mixing apparatus, the combination of a bracket having an upright thereon, a pair of bevel gears and a horizontal shaft for driving them on the base of said bracket, an upright shaft driven by said beveled gears having a spider thereon, a mixing drum detachably mounted on said spider and rotated by said gears, a bracket mounted on said upright overhanging the mixing drum horizontally, wire fingers projecting downward from said bracket into the mixing drum, said upright having a fork on the top thereof, guide lugs on the side of said upright in which said bracket is adapted to engage, and by which lugs and fork it is held in place.

2. In a mixing apparatus, the combination of an upright and a clamp for supporting it, a bracket extending horizontally from the top of the upright, said bracket being adjustable and removable vertically therefrom, a drum mounted to rotate in said mixing apparatus, means for holding said bracket diametrically over the drum, a series of stationary wire fingers extending down from said bracket, means for rotating the drum concentrically with reference to said fingers, said holding means comprising an upright having a fork on the top thereof, guide lugs on the side of said upright in which said bracket is adapted to engage, and by which lugs and fork it is held in place.

3. In a mixing apparatus, the combination of an upright having a forked end at the top thereof and a perforated lug on the side thereof, a right angled bracket having a vertical member adapted to engage in said perforated lug and having a horizontal member adapted to engage in the forked end of the upright by which the horizontal member is held stationary, stationary fingers extending down from said horizontal member, a drum mounted to rotate under said horizontal member into which drum said fingers extend, said fingers being adapted to mix the contents of said drum as the drum rotates.

In testimony whereof I affix my signature.

KAZIMIER J. TRYNOSKI.